United States Patent

[11] 3,630,484

| [72] | Inventor | Julian S. Taylor |
| | | 8600 S.W. 8, Oklahoma City, Okla. 73128 |
| [21] | Appl. No. | 16,165 |
| [22] | Filed | Mar. 3, 1970 |
| [45] | Patented | Dec. 28, 1971 |

[54] RESTRICTOR VALVE
4 Claims, 7 Drawing Figs.

[52] U.S. Cl. ............................................. 251/208
[51] Int. Cl. ............................................. F16k 5/12
[50] Field of Search ................................. 251/208, 209, 205, 250.5, 248

[56] References Cited
UNITED STATES PATENTS

| 1,986,252 | 1/1935 | Conran | 251/248 X |
| 2,878,829 | 3/1959 | Folmsbee | 251/248 X |
| 3,014,489 | 12/1961 | Lamp, Jr. et al. | 251/208 X |
| 3,118,472 | 1/1964 | Buie | 251/208 X |
| 3,334,861 | 8/1967 | Westbrook | 251/208 |

FOREIGN PATENTS

| 413,867 | 6/1946 | Italy | 251/208 |
| 852,797 | 10/1952 | Germany | 251/205 |

*Primary Examiner*—Samuel Scott
*Attorney*—Robert K. Rhea

ABSTRACT: In a restrictor valve, having a flow passage, a pair of aligned orifice plates are positioned in the housing to define an intermediate portion of the flow passage. A central disk, interposed between the pair of plates, is provided with an opening mating and mismating with the flow passage upon axial rotation of the disk. Externally operated gear means, extending through the housing, engages the periphery of the disk for axial rotation of the latter.

Patented Dec. 28, 1971
3,630,484
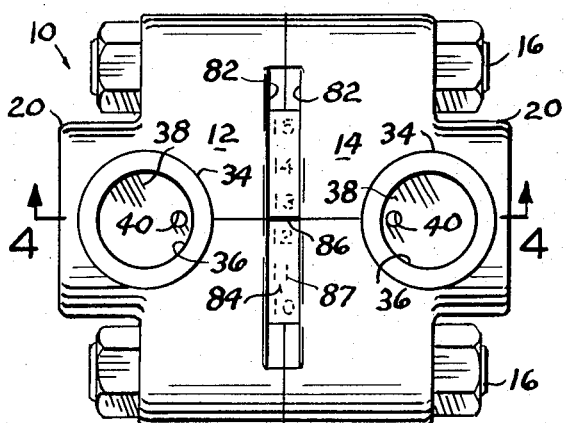
FIG.1
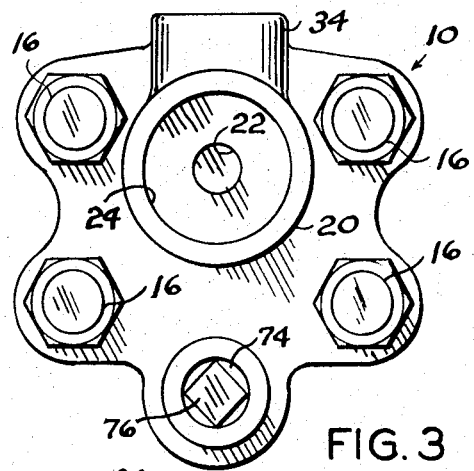
FIG.3
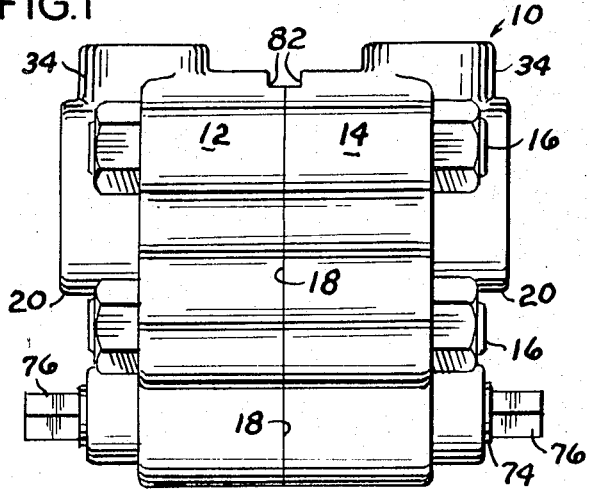
FIG.2
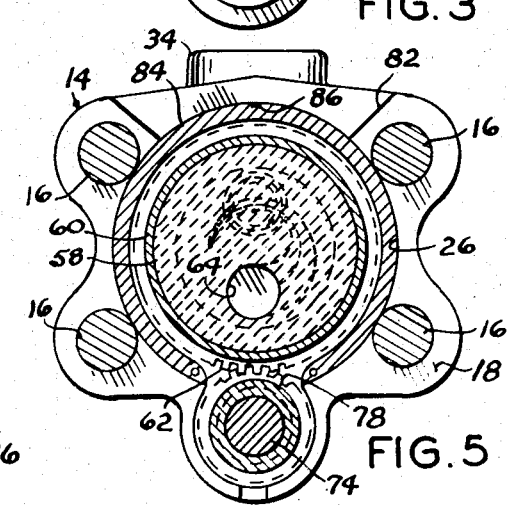
FIG.5
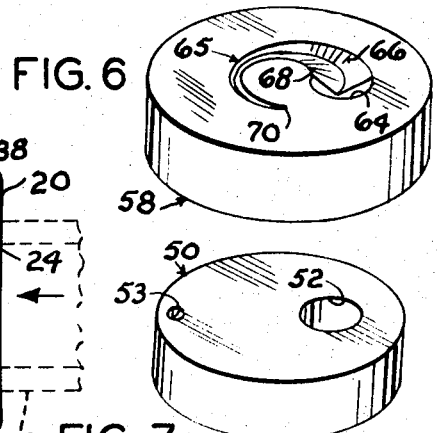
FIG.6
FIG.7
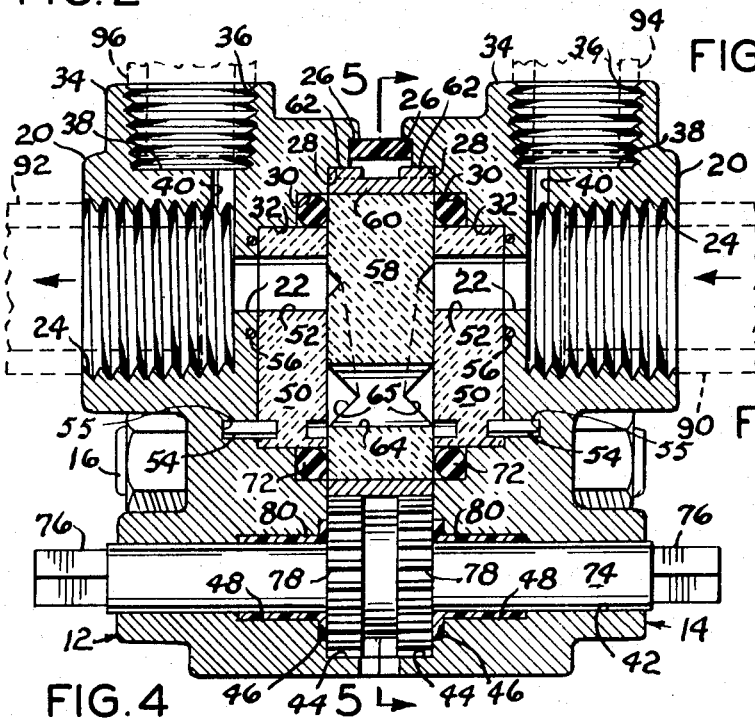
FIG.4
JULIAN S. TAYLOR
INVENTOR.
BY
Robert K. Rhea
AGENT

RESTRICTOR VALVE

BACKGROUND OF THE INVENTION

1. Field of the Invention

The present invention relates to flow restrictor valves commonly referred to as orifice valves and more particularly to a multiple stage orifice plate valve for controlling the flow rate of fluids containing abrasive materials.

The present invention has particular application in the control of well produced fluids to control the rate of flow through a flow line. Heretofore such orifice valves have usually comprised one or more orifices in a relatively stationary disk and a rotatable disk having one or more orifices which may be brought into and out of alignment with orifices in the stationary disk. As the rotatable disk is moved angularly to restrict the flow through the orifices to a comparatively small volume, it has been found that the relatively high fluid velocity generated by wellhead pressure will cause erosion within the assembly, either within the assembly itself or downstream from the downstream orifice plate. Such erosion has in part been avoided by use of erosion-resistant materials such as tungsten carbide or ceramic materials, however, even these hard materials are subject to erosion thus shortening the life of the valve.

This invention involves the recognition of the problem of erosion caused by the high velocity streams of erosive fluids and also the erosive problem caused by the angular direction of the high velocity flow through partially closed orifices which results in a high velocity stream impinging on knife edges of mating hole surfaces to cause a tremendous pressure drop over a very short distance. The approach here is eo dissipate energy over a relatively long flow passage both with restriction and direction change.

2. Description of the Prior Art

U.S. Pat. Nos. 3,207,181 and 3,331,396 disclose orifice valves which feature a plurality of disk members of hardened material having orifices therethrough with one of the disks rotatable with respect to the other generally stationary disk wherein an enlarged downstream opening permits impinging the erosive fluid on a hardened material to align the fluid stream with the downstream passageway. However, these valves do not compensate for the erosion of the material forming the disks at the point of partially mismating orifices.

This invention, on the other hand, provides a central rotatable disk having an orifice rotatable into and out of alignment with aligned orifices through oppositely disposed stationary orifice plates wherein the central disk is provided with opposing arcuate grooves or recesses for regulating the flow volume.

SUMMARY OF THE INVENTION

A valve body having a flow passage is provided with a pair of orifice plates intersecting the flow passage and having orifices therethrough aligned with the flow passage. A rotatable disk is interposed between the pair of plates and is provided with an orifice rotatable into and out of alignment with the orifices of the pair of plates. The rotatable disk is further provided with arcuate substantially V-shaped inclined grooves on its respective opposing end surfaces cooperatively formed on a radius complemental with the radius of rotation of the rotatable disk orifice and in communication therewith. These grooves are characterized by the bottom of their V-shaped beginning on an incline in the place of the respective end of the rotatable disk and converging toward each other. Thus, the erosive effect of high velocity fluids flowing through the orifices is directed more particularly against the surfaces forming the upstream groove on the central disk wherein the resultant erosion of the central disk may be compensated for by rotating the disk so that the smaller end portion of the upstream groove intersects the stream of fluid.

Externally operated gear means is supported by the body for engaging gear teeth surrounding the periphery of the rotatable disk for rotating the latter.

The principal object of the invention is to provide a flow restrictor valve having multiple disks provided with mating and mismating orifices including grooves formed on opposing end surfaces of a central rotatable disk for regulating fluid flow through the orifices.

BRIEF DESCRIPTION OF THE DRAWINGS

FIG. 1 is a top view of the valve;

FIG. 2 is a side elevational view;

FIG. 3 is an end elevational view;

FIG. 4 is a vertical cross-sectional view, to an enlarged scale, taken substantially along the line 4—4 of FIG. 1;

FIG. 5 is a vertical cross-sectional view, to a different scale, taken substantially along the line 5—5 of FIG. 4;

FIG. 6 is a perspective view, to a different scale, of the rotatable disk, per se; and, FIG. 7 is a perspective view of one of the pair of orifice plates.

DESCRIPTION OF THE PREFERRED EMBODIMENT

Like characters of reference designate like parts in those figures of the drawings n which they occur.

In the drawings:

The reference numeral 10 indicates the valve, as a whole, comprising a two-part housing or body, indicated at 12 and 14. The body parts or halves 12 and 14 are identical and are connected together by a plurality of bolts and nuts 16 extending through aligned apertures. In the interest of brevity, only the body 14 will be described in detail.

The body 14 is provided with a flat face 18 which abuts a similar face on the housing 12 when assembled therewith. The body surface, opposite the face 18, is provided with a boss 20 which is centrally drilled, as at 22, to provide a flow passage which is counterbored, within the boss 20, and threaded, as at 24. The body 14 is step-diameter counterbored, as at 26, 28, 30 and 32, inwardly from its face 18 and axially offset with respect to the axis of the flow passage 22 for the purposes presently explained.

A second boss 34, formed on the body 14 laterally of the boss 20, is drilled and threaded, as at 36, on an axis normal to the axis of the threaded bore 24, forming an inner end or wall surface 38 defining the inner limit of the threaded bore 36. A relatively small bore 40, through the wall 38 adjacent the inner limit of the threaded bore 24, provides communication between the threaded bores 24 and 36 for the purposes presently explained.

The body 14 is further drilled, as at 42, on an axis offset and parallel to the axis of the flow passage 22 is similarly step-diameter counterbored, as at 44, 46 and 48, from its face 18 concentric with the bore 42. The counterbore 44 intersects an arc of the counterbore 28 for the purposes presently explained.

A pair of cylindrical disks or orifice plates 50, each formed of hard erosive resistant material, such as ceramic, are positioned, respectively, within the flow passageway counterbore 32 of the valve body halves 12 and 14 and transversely span the passageway 22. The plates 50, are each provided with an opening or orifice 52 having a diameter of a selected size coaxially aligned with the flow passage 22. The plates 50 are maintained stationary by a pin 54 extending into a socket 53 in each plate (FIG. 7) and a cooperating socket 55 formed respectively in each valve body. An O-ring 56, nested by a suitable groove in the respective valve body concentric with the flow passage 22, seals the plates 50 with the inward limit of the counterbore 32.

A central rotatable orifice plate or disk 58, similarly formed of hardened material, such as ceramic, is concentrically interposed between the plates 50 in face to face contiguous contact therewith. The periphery of the disk 58 is surrounded and bonded to a metallic band 60 having two spaced-apart rows of gear teeth 62 extending therearound. The disk 58 and rows of gear teeth 62 are nested by the respective counterbore 28.

The disk 58 is provided with an opening or orifice 64 diametrically substantially equal to the plate orifices 52 and rotatable into and out of mating relation with respect to the orifices 52 by axial rotation of the disk 58 as presently explained.

Each end face of the disk 58 is provided with a groove 65 characterized by inwardly converging side surfaces 66 and 68, forming a substantial V-shaped communicating at one end with the orifice 64 and tapering outwardly toward the respective end faces of the disk 58 on a relatively constant radius, equal to the radius between the axial center of the disk 58 and the axis of its orifice 64, terminating substantially 180° to 270° from the axis of the orifice 64. The groove 65 thus defines a spacing between the end 70 of the groove and the periphery of the orifice 64 great enough to encompass or cover the orifice 52 of the stationary plate 50. An O-ring 72 is received by the body counterbore 30 in surrounding relation with respect to each plate 50 and seals with the respective end face of the disk 58.

A shaft 74 is coaxially received by the body bore 42. Each end of the shaft projects outwardly from the respective limit of each body opposite the face 18 and is provided with wrench flats 76 for rotating the shaft. Medially its ends the shafts 74 is provided with a spur gear coaxially received by the counterbore 44. The spur gear is characterized by two rows of spaced-apart teeth 78 in mesh with the respective rows of teeth 62 surrounding the rotatable disk 58. A suitable bearing 80 is cooperatively received by the counterbores 46 and 48 and journals the shaft 74 in the respective valve body.

The body 14 is further provided with an opening 82 extending inwardly from its surface opposite the shaft 74 and face 18 and communicating with an arc of the counterbore 26. A length of straplike transparent flexible material, such as plastic 84, rectangular in cross section, is nested at its respective lateral side surface by the body counterbore 26 in partially surrounding relation with respect to the periphery of the rows of gear teeth 62. A line 86 is transversely formed or scored on the strap material 84 medially its length and the length of the body opening 82 for registration with selected indicia 87, that, for instance can be graduated in equivalent circular openings in 64ths of an inch, formed, marked or scored on the periphery of the band 60 between the rows of teeth 62.

OPERATION

Obviously flow is permitted through the valve passageway 22 in either direction. Assuming the valve body 14 is the upstream end, the threaded bore 24 is connected with a tube or pipe 90 while the similarly threaded bore 24 of the other valve body 12 is connected with a downstream tube or pipe 92. Rotation of the central disk 58 is then achieved by a wrench, not shown, applied to one of the wrench flats 76 wherein the spur gear 78 rotates the disk 58 by engagement with the gear teeth 62 so that the center disk orifice 64 and associated V-grooves 65 may be coaxially mated or mismatched with the orifices 52 of the plates 50. As shown by FIG. 4, a selected portion of the arcuate grooves 65 is positioned to intersect the axis of the plate orifices 52. The fluid under the pressure of several atmospheres, not shown, impinges on and passes through the center disk 58 by entering the upstream groove 65, through the disk orifice 64 and into the downstream groove 65. Thus a restriction and tortuous path is formed for the fluid which eliminates the erosion of knifelike edges formed by restrictor valves having circular orifices partially mismated. The position of the center disk and its grooves is determined by observing the position of selected ones of the indicia 87 aligned with or on either side of the scored line 86 which permits accurate positioning of the disk orifice and control of the degree of flow opening. Furthermore, the center disk 58 may be rotated until its imperforate portions, between its orifice 64 and the groove end 70, covers the orifices 52 to interrupt flow through the passageway 22.

Pressure reading means, such as gauge plugs or pressure gauges, neither of which are shown, are connected with each threaded bore 36, as indicated by the dotted lines 94 and 96, to obtain an upstream and downstream pressure reading of fluid flow through the valve 10.

Since the size of the grooves is known, readings of up and downstream pressure gauges or gauge plugs, not shown, connected with the threaded bores 36 reveals the pressure differential and permits calculation of the rate or volume of fluid flow through the valve.

Obviously the invention is susceptible to changes or alterations without defeating its practicability, therefore, I do not wish to be confined to the preferred embodiment shown in the drawing and described herein.

I claim:

1. A restrictor valve, comprising: a valve body having a flow passageway including an inlet leading to said passageway and an outlet leading from said passageway,
    said body having counterbores intersecting and spanning the passageway;
    a pair of stationary plates disposed within the counterbores in parallel spaced-apart relation,
        each of said plate having an orifice coaxially aligned with the passageway;
    a rotatable disk interposed between said plates,
        said disk having an orifice movable into and out of registration with the orifices of said plates for controlling the flow of fluid through the passageway
        said rotatable disk having end faces respectively contiguously contacting the respective said plate,
        each said end face having a flow-restricting inclined groove having a length at least equal to the diameter of the disk orifice formed therein communicating, at one end, with the orifice in said disk and terminating, at its other end, in the plane of the respective end face for changing the direction of a stream moving through the passageway when said rotatable disk orifice is out of registration with the orifices in said plates; and,
    means extending into said body and engaging said disk for rotating the latter.

2. Structure as specified in claim 1 and further including:
    gear teeth secured to the periphery of said disk,
        said means including a shaft journaled by said body, and
        a spur gear on said shaft meshing with gear teeth on said rotatable disk.

3. Structure as specified in claim 1 in which the grooves in said end faces are disposed in opposite alignment and are formed on a radius common to the axis of the orifice in said disk.

4. Structure as specified in claim 3 and further including:
    registration means visually indicating the relative position of the grooves and the orifice in said disk with respect to the passageway.

* * * * *

PO-1050
(5/69)

UNITED STATES PATENT OFFICE
CERTIFICATE OF CORRECTION

Patent No. 3,630,484          Dated December 28, 1971

Inventor(s) Julian S. Taylor

It is certified that error appears in the above-identified patent and that said Letters Patent are hereby corrected as shown below:

Column 1, line 32, "eo" should read --to--.

Column 3, line 46, "2" should read --a--; line 53, "mismatched" should read --mismated--.

Column 4, line 36, a comma (,) should follow "passageway"; lines 56 and 57, should read --formed on a radius common to the radial spacing between the axis of said disk and the axis of the orifice in said disk--.

Signed and sealed this 4th day of July 1972.

(SEAL)
Attest:

EDWARD M. FLETCHER, JR.
Attesting Officer

ROBERT GOTTSCHALK
Commissioner of Patents